United States Patent
Srivastava et al.

(10) Patent No.: US 11,526,386 B2
(45) Date of Patent: Dec. 13, 2022

(54) SYSTEM AND METHOD FOR AUTOMATICALLY SCALING A CLUSTER BASED ON METRICS BEING MONITORED

(71) Applicant: ORACLE INTERNATIONAL CORPORATION, Redwood Shores, CA (US)

(72) Inventors: Rahul Srivastava, Bengaluru (IN); Prasad Subramanian, Bengaluru (IN); Ashokkumar Kannan, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/374,586

(22) Filed: Apr. 3, 2019

(65) Prior Publication Data
US 2020/0319935 A1    Oct. 8, 2020

(51) Int. Cl.
*G06F 9/50*    (2006.01)
*G06F 9/48*    (2006.01)
(Continued)

(52) U.S. Cl.
CPC ............ *G06F 9/5088* (2013.01); *G06F 9/455* (2013.01); *G06F 9/45533* (2013.01);
(Continued)

(58) Field of Classification Search
CPC ........ G06F 9/48; G06F 9/4806; G06F 9/4843; G06F 9/485; G06F 9/4856; G06F 9/4881;
(Continued)

(56) References Cited

U.S. PATENT DOCUMENTS 8,856,797 B1 * 10/2014 Siddiqui ............. H04L 43/0894
                                                        718/104
10,613,888 B1 *  4/2020 Mentz ................ G06F 9/45558
(Continued)

OTHER PUBLICATIONS

"Alerting rules", Prometheus, retrieved on Dec. 28, 2018 from https://prometheus.io/docs/prometheus/latest/configuration/altering_rules/, 21 pages.
(Continued)

*Primary Examiner* — Charles M Swift
(74) *Attorney, Agent, or Firm* — Tucker Ellis LLP (57) ABSTRACT

In accordance with an embodiment, described herein is a system and method for use in a distributed computing environment, for automatically scaling a cluster based on metrics being monitored. A cluster that comprises a plurality of nodes or brokers and supports one or more colocated partitions across the nodes, can be associated with an exporter process and alert manager that monitors metrics associated with the cluster. Various metrics can be associated with user-configured alerts that trigger or otherwise indicate the cluster should be scaled. When a particular alert is raised, a callback handler associated with the cluster, for example an operator, can automatically bring up one or more new nodes, that are added to the cluster, and then reassign a selection of existing colocated partitions to the new nodes/brokers, such that computational load can be distributed within the newly-scaled cluster environment.

18 Claims, 8 Drawing Sheets

(51) Int. Cl.
  *G06F 9/455* (2018.01)
  *G06F 11/20* (2006.01)
  *G06F 11/30* (2006.01)
  *G06F 9/54* (2006.01)
(52) U.S. Cl.
  CPC ............ *G06F 9/45558* (2013.01); *G06F 9/48* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/505* (2013.01); *G06F 9/5011* (2013.01); *G06F 9/5027* (2013.01); *G06F 9/5061* (2013.01); *G06F 9/5072* (2013.01); *G06F 9/5077* (2013.01); *G06F 9/5083* (2013.01); *G06F 9/542* (2013.01); *G06F 11/20* (2013.01); *G06F 11/202* (2013.01); *G06F 11/203* (2013.01); *G06F 11/2023* (2013.01); *G06F 11/2041* (2013.01); *G06F 11/30* (2013.01); *G06F 11/301* (2013.01); *G06F 11/3003* (2013.01); *G06F 11/3006* (2013.01); *G06F 2009/4557* (2013.01); *G06F 2009/45575* (2013.01)

(58) Field of Classification Search
  CPC ........ G06F 9/50; G06F 9/5005; G06F 9/5011; G06F 9/5027; G06F 9/505; G06F 9/5061; G06F 9/5072; G06F 9/5083; G06F 9/5088; G06F 9/455; G06F 9/45533; G06F 9/45558; G06F 2009/4557; G06F 2009/45575; G06F 11/20; G06F 11/202; G06F 11/2023; G06F 11/203; G06F 11/2041; G06F 11/30; G06F 11/3003; G06F 11/3006; G06F 11/301
  See application file for complete search history.

(56) References Cited

U.S. PATENT DOCUMENTS

| | | | |
|---|---|---|---|
| 2010/0144310 A1* | 6/2010 | Bedingfield, Sr. | H04M 15/846 455/405 |
| 2011/0107358 A1* | 5/2011 | Shyam | G06F 9/547 719/330 |
| 2016/0323377 A1* | 11/2016 | Einkauf | H04L 67/1076 |
| 2017/0063722 A1* | 3/2017 | Cropper | H04L 47/823 |
| 2017/0295082 A1* | 10/2017 | Wu | H04L 67/10 |
| 2018/0048545 A1* | 2/2018 | Mishalov | H04L 43/08 |
| 2019/0081879 A1* | 3/2019 | Wu | H04L 43/16 |
| 2019/0095252 A1* | 3/2019 | Tseng | G06F 9/5077 |
| 2019/0243688 A1* | 8/2019 | Karmarkar | G06F 9/5011 |
| 2019/0250946 A1* | 8/2019 | Parameshwaran | G06F 9/5088 |
| 2020/0065126 A1* | 2/2020 | Zheng | G06F 9/5077 |

OTHER PUBLICATIONS

"Configuration", Prometheus, retrieved on Dec. 28, 2018 from https://prometheus.io/docs/altering/configuration/, 21 pages.
GitHub, "A Kafka Operator for Kubernetes", retrieved on Apr. 24, 2019 from https://github.com/krallistic/kafka-operator, 5 pages.
Lim, et al., "Ampersand—Building Elastic Clusters", retrieved on Apr. 24, 2019 from https://blog.jimjh.com/building-elastic-clusters.html, 5 pages.
Molnar, Balint, "Kafka on Kubernetes—using etcd", Part 1, retrieved on Mar. 11, 2019 from https://banzaicloud.com/blog/kafka-on-etcd/, 8 pages.
Molnar, Balint, "Kafka on Kubernetes—using etcd", Part 2, retrieved on Mar. 11, 2019 from https://banzaicloud.com/blog/kafka-on-etcd/, 5 pages.
Narkhede, Neha, "Introducing the Confluent Operator: Apache Kafka on Kubernetes Made Simple", Confluent, May 3, 2018, retrieved on Apr. 24, 2019 from https://www.confluent.io/blog/introducing-the-confluent-operator-apache-kafka-on-kubernetes/, 7 pages.
Strimzi, "Apache Kafka on OpenShift and Kubernetes", retrieved on Apr. 24, 2019 from https://strimzi.io, 2 pages.
Wang, Allen, "Kafka At Scale In The Cloud", Netflix, retrieved on Apr. 24, 2019 from https://www.slideshare.net/Confluentinc/kafka-at-scale-in-the-cloud, 22 pages.
Yang, Yu, "Open sourcing DoctorKafka: Kafka cluster healing and workload balancing", Pinterest Engineering, Aug. 24, 2017, retrieved on Apr. 24, 2019 from https://medium.com/@Pinterest_Engineering/open-sourcing-doctorkafka-kafka-cluster-healing-and-workload-balancing-e51ad25b6b17, 6 pages.

\* cited by examiner

200
SYSTEM AND METHOD FOR AUTOMATICALLY SCALING A CLUSTER BASED ON METRICS BEING MONITORED

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to distributed computing environments having clusters of nodes or brokers, and are particularly related to systems and methods for automatically scaling a cluster based on metrics being monitored.

BACKGROUND

In a distributed computing environment having a cluster of nodes that supports one or more colocated partitions distributed across the nodes, when the cluster becomes overloaded, it must generally be expanded by adding more nodes, to avoid a potential system crash.

However, in some distributed computing environments, for example Apache Kafka environments, user intervention is typically required to bring up an additional node or broker, and then, when the new node has been added to the cluster, manually reassign some of the existing colocated partitions distributed across the nodes, to the newly-added node.

If the cluster is provisioned in a cloud or other complex environment, then additional user-performed tasks may be required, before the cluster can be expanded and its load redistributed.

The need for such human intervention inherently introduces latency when the cluster is under stress and requires expansion. These are some examples of the types of environments in which embodiments described herein can be used.

SUMMARY

In accordance with an embodiment, described herein is a system and method for use in a distributed computing environment, for automatically scaling a cluster based on metrics being monitored.

A cluster that comprises a plurality of nodes or brokers and supports one or more colocated partitions across the nodes, for example in a Kafka environment, a Kafka cluster, can be associated with an exporter process and alert manager that monitors metrics associated with the cluster.

Various metrics can be associated with user-configured alerts that trigger or otherwise indicate the cluster should be scaled.

When a particular alert is raised, a callback handler associated with the cluster, for example, in a Kafka environment, a Kafka operator, can automatically bring up one or more new nodes, that are added to the cluster, and then reassign a selection of existing colocated partitions to the new nodes/brokers, such that computational load can be distributed within the newly-scaled cluster environment.

DETAILED DESCRIPTION

As described above, in a distributed computing environment having a cluster of nodes that supports one or more colocated partitions distributed across the nodes, when the cluster becomes overloaded, it must generally be expanded by adding more nodes, to avoid a potential system crash.

However, in some distributed computing environments, for example Apache Kafka environments, user intervention is typically required to bring up an additional node or broker, and then, when the new node has been added to the cluster, manually reassign some of the existing colocated partitions distributed across the nodes, to the newly-added node.

In accordance with an embodiment, described herein is a system and method for use in a distributed computing environment, for automatically scaling a cluster based on metrics being monitored.

A cluster that comprises a plurality of nodes or brokers and supports one or more colocated partitions across the nodes, for example, in a Kafka environment, a Kafka cluster, can be associated with an exporter process and alert manager that monitors metrics associated with the cluster.

Various metrics can be associated with user-configured alerts that trigger or otherwise indicate the cluster should be scaled.

When a particular alert is raised, a callback handler associated with the cluster, for example, in a Kafka environment, a Kafka operator, can automatically bring up one or more new nodes, that are added to the cluster, and then reassign a selection of existing colocated partitions to the new nodes/brokers, such that computational load can be distributed within the newly-scaled cluster environment.

In accordance with various embodiments, a technical purpose of the systems and methods described herein includes, for example, that a scaling operation enables a cluster having a plurality of nodes/brokers supporting one or more colocated partitions, to operate autonomously, including automatically scaling up or down, and reassigning a selection of existing colocated partitions to new nodes/ brokers, depending on a current workload and in accordance with user-configured alerts. This enables computational load to be more evenly distributed within the newly-scaled cluster environment.

In accordance with an embodiment, the techniques described herein can be used in conjunction with, for example, a Kafka or other type of distributed computing environment that, for example, provides distributed streaming or messaging and maintains feeds of messages in topics which are partitioned and replicated across multiple nodes/brokers of a cluster.

For example, in accordance with an embodiment, in a Kafka environment, a Kafka operator can be used to create, configure, and manage instances of Kafka applications operating within a Kafka cluster, by extending the underlying Kafka application program interface (API) that enables the creation, configuration and management of deployed applications, and depending on a current workload and in accordance with user-configured alerts, reassigning a selection of existing colocated partitions to new nodes/brokers, such that computational load of the Kafka environment is more evenly distributed across the Kafka cluster.

Although many of the features and techniques described herein are illustrated using the example of a Kafka environment; in accordance with various embodiments, the features and techniques can be similarly used with other types of distributed computing environments.

Automatic Scaling of Clusters

Figure 1:
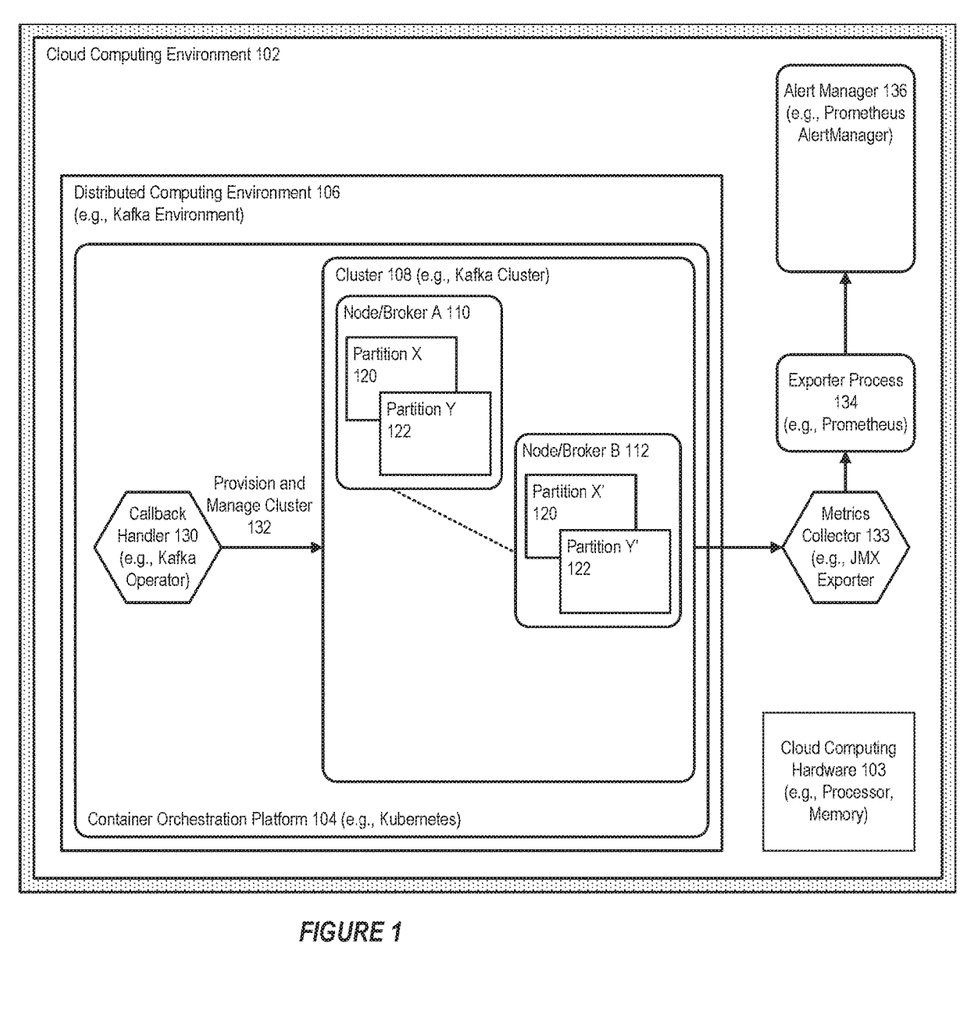
FIG. 1 illustrates a system for use in a distributed computing environment, for automatically scaling a cluster based on metrics being monitored, in accordance with an embodiment.

FIG. 1 illustrates a system for use in a distributed computing environment, for automatically scaling a cluster based on metrics being monitored, in accordance with an embodiment.

As illustrated in FIG. 1, in accordance with an embodiment, a cloud computing environment 102, such as, for example, an Oracle Cloud Infrastructure (OCI) environment, which executes on one or more computer servers or cloud computing hardware 103 (e.g., processor/CPU, memory), can include or operate in association with a container orchestration platform component 104, such as, for example, a Kubernetes or other type of container orchestration environment, that enables deployment, scaling, and management of containerized applications.

For example, in accordance with an embodiment, the cloud computing environment supports the use of a distributed computing environment 106 that, for example, provides distributed streaming or messaging, such as, for example, a Kafka environment, and maintains feeds of messages in topics which are partitioned and replicated across multiple nodes/brokers of a cluster 108, for example a Kafka cluster.

For example, in accordance with an embodiment, the cluster can include a first node/broker A 110, and a second node/broker B 112, each of which includes one or more colocated partitions A 120, B 122, distributed within the cluster.

In accordance with an embodiment, a callback handler 130, for example in a Kafka environment, a Kafka operator, can be used to create, configure, and manage 132 instances of Kafka applications, by extending the underlying Kafka API to enable the creation, configuration and management of a specific application deployed to the Kafka environment.

In accordance with an embodiment, in a Kafka environment, the Kafka cluster can be associated with a metrics collector 133, for example a Java Management Extensions (JMX) exporter, or other type of metrics collector, that can expose cluster metrics, e.g., Kafka cluster metrics, an exporter process 134, and an alert manager 136 that monitors metrics data associated with the cluster.

In accordance with an embodiment, the exporter process and alert manager monitors metrics associated with the cluster, for use in determining alerts on relevant metrics to trigger scaling the cluster. Various metrics can be associated with user-configured alerts that trigger or otherwise indicate the cluster should be scaled.

For example, in accordance with an embodiment, a JMX exporter can expose Kafka cluster metrics to an exporter process, for example as can be provided by a metrics monitoring and alerting environment, such as, for example a Prometheus server (developed in accordance with the Prometheus open-source software project of the Cloud Native Computing Foundation), or other type of exporter process or metrics monitoring and alerting environment, wherein the exporter process communicates triggered alerts to an alert manager component, for example as can be provided by a Prometheus AlertManager, or other type of alert manager.

In accordance with an embodiment, the various components or processes described above, such as, for example, the callback handler, operator, metrics collector, exporter process, and/or alert manager, can be provided as software or program code executable by a computer system or other type of processing device.

In accordance with an embodiment, the metrics data received in connection with the cluster are continuously monitored, and compared with a plurality of user-configured alert rules and threshold values. When a particular threshold value is breached or otherwise exceeded, a corresponding alert is fired, and an appropriate action is performed on the cluster and its nodes.

For example, in accordance with an embodiment, when a particular alert is raised, a callback handler associated with the cluster, for example a Kafka operator, can automatically bring up one or more new nodes, for example Kafka brokers, add those to the cluster, and reassign a selection of existing colocated partitions to the new nodes/brokers, such that computational load is more evenly distributed within the newly-scaled cluster environment.

In accordance with an embodiment, an alert can be associated with, for example, a webhook, or other type of callback, which operates with, in a Kafka environment, the Kafka operator to initiate scaling of the cluster, including the reassignment of a selection of existing colocated partitions to the new nodes/brokers. The alert can include annotations, for use in determining or controlling the scaling operation.

Adding a node to a cluster may not itself reduce the load at the cluster, since there may be multiple partitions on the existing brokers, which have not yet been migrated yet, some of those partitions can be migrated to the newly-added broker.

To address this, in accordance with an embodiment, as part of the scaling of the cluster, including the reassignment of a selection of existing colocated partitions to the new nodes/brokers, an original partition distribution plan (that may specify certain brokers) is revised to a new partition distribution plan that specifies a new shape of the cluster (i.e., the current set of nodes/partitions). The system can then automatically reassign partitions to new nodes/brokers according to the new distribution plan.

In accordance with an embodiment, in a Kafka environment, the Kafka operator can intelligently determine a new distribution plan based on the cluster metrics and annotations that are passed to the operator by the alert manager, via the callback handler.

For example, in accordance with an embodiment, the Kafka operator can control the reassignment of colocated partitions to provide that a heavily-loaded broker and/or its partitions do not coexist on the same set of brokers after the new distribution plan is implemented.

In accordance with an embodiment, instead of a separate exporter process (for example, as provided by a Prometheus server) and/or separate alert manager (for example, as provided by a Prometheus AlertManager), a monitoring and callback functionality can be provided within the system, in accordance with the above description, to receive information from the, e.g., JMX exporter, and examine user-configured alert rules and threshold values, to make a decision to scale up the cluster when required.

In accordance with an embodiment, the described approach avoids the need for human intervention to bring up an additional node, and then, when the new node has been added to the cluster, manually reassign some of the load, for example existing partitions, to the newly-added node.

In accordance with an embodiment, instead the system can operate so that, for example, as alerts are raised then, the callback handler can automatically bring up a new broker, add it to the cluster, and reassign some of the existing colocated partitions to the new broker such that load is more evenly distributed in the new cluster.

This scaling operation enables the Kafka cluster to operate autonomously, including that the cluster can automatically scale up or down, and reassign a selection of existing colocated partitions to new nodes/brokers, depending on a current workload.

Additionally, in accordance with various embodiments, the approach can be used to scale other types of clusters, such that they do not need to be continuously monitored by a human for performance and availability, but instead can scale up or down as necessary; which leads to savings in operating costs, along with a higher degree of availability assurance.

Figure 2:
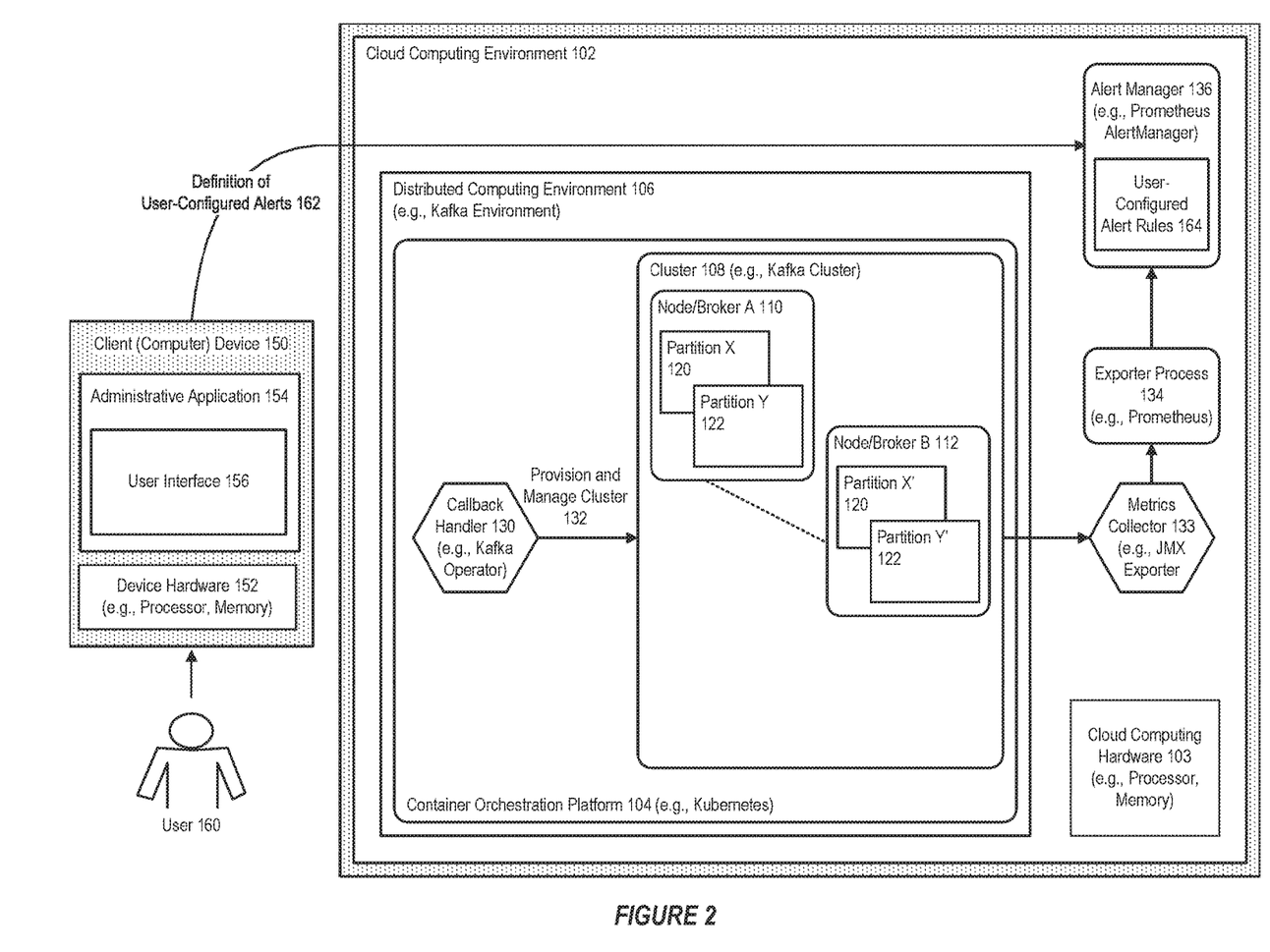
FIG. 2 further illustrates a system for automatically scaling a cluster based on metrics being monitored, in accordance with an embodiment.

FIG. 2 further illustrates a system for automatically scaling a cluster based on metrics being monitored, in accordance with an embodiment.

As illustrated in FIG. 2, in accordance with an embodiment, a client (computer) device 150 having a device hardware 152 (e.g., processor, memory), and executing an administrative application 154 that includes a graphical user interface 156, enables a user 160 to provide a definition of user-configured alerts 162, that are then used in configuring the alert manage with a plurality of user-configured alert rules 164.

Figure 3:
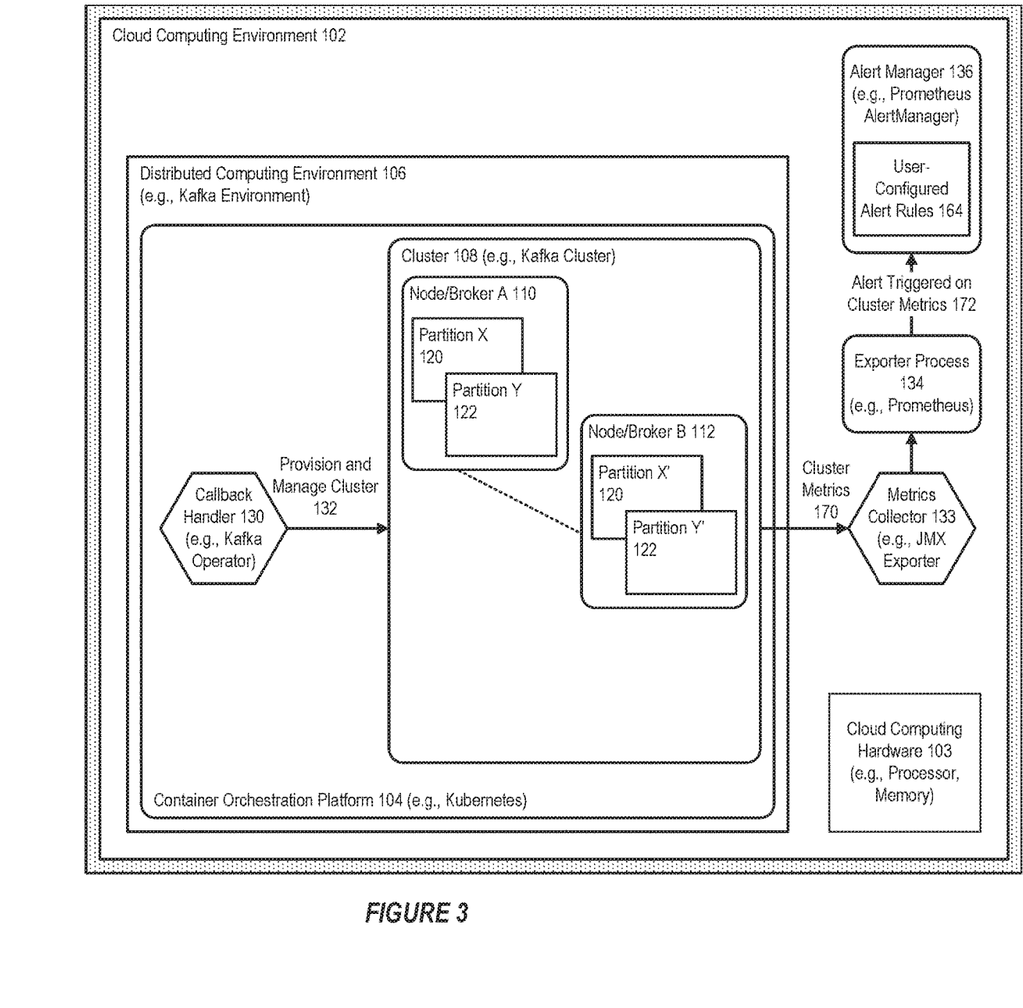
FIG. 3 further illustrates a system for automatically scaling a cluster based on metrics being monitored, in accordance with an embodiment.

FIG. 3 further illustrates a system for automatically scaling a cluster based on metrics being monitored, in accordance with an embodiment.

As illustrated in FIG. 3, in accordance with an embodiment, the metrics collector can expose cluster metrics 170, e.g., Kafka cluster metrics. The exporter process and alert manager monitors metrics data associated with the cluster, for example a Kafka cluster, for use in determining alerts 172 on relevant metrics to trigger scaling the cluster.

Figure 4:
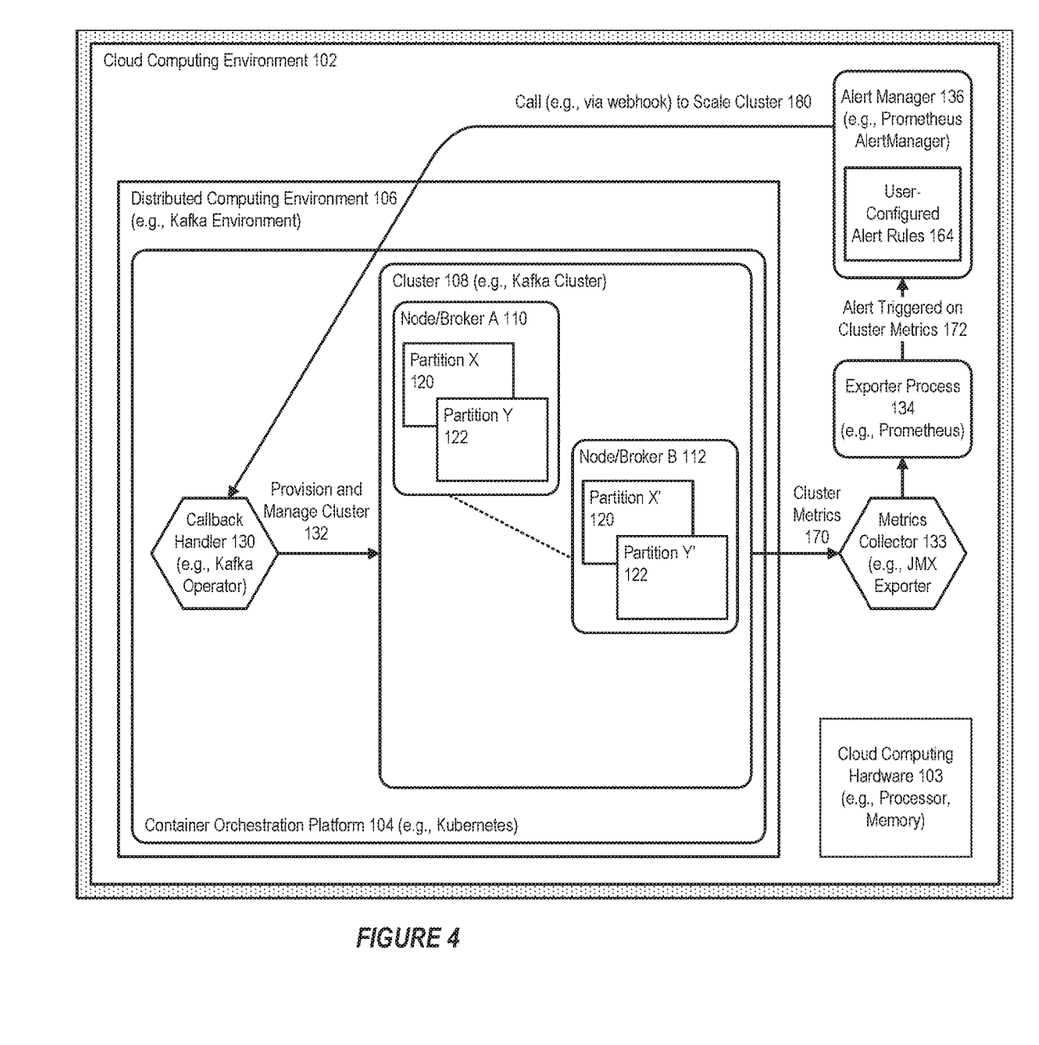
FIG. 4 further illustrates a system for automatically scaling a cluster based on metrics being monitored, in accordance with an embodiment.

FIG. 4 further illustrates a system for automatically scaling a cluster based on metrics being monitored, in accordance with an embodiment.

As illustrated in FIG. 4, in accordance with an embodiment, an alert can be associated with, for example, a webhook or other type of callback which, when called 180, operates with the Kafka operator to initiate scaling of the cluster, including the reassignment of a selection of existing colocated partitions to the new nodes/brokers.

Figure 5:
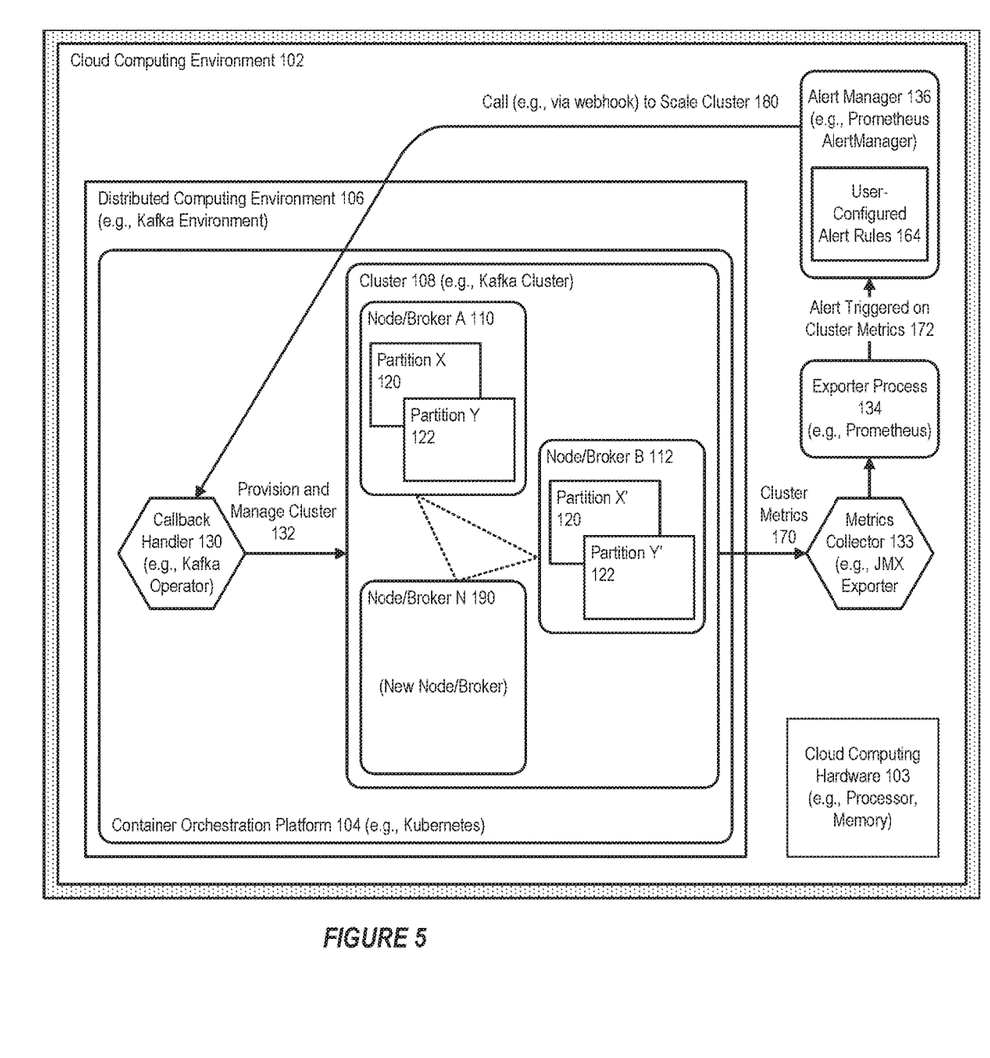
FIG. 5 further illustrates a system for automatically scaling a cluster based on metrics being monitored, in accordance with an embodiment.

FIG. 5 further illustrates a system for automatically scaling a cluster based on metrics being monitored, in accordance with an embodiment.

As illustrated in FIG. 5, in accordance with an embodiment, a Kafka operator, can automatically bring up one or more new nodes, e.g., node/broker N 190, that are added to the cluster.

Figure 6:
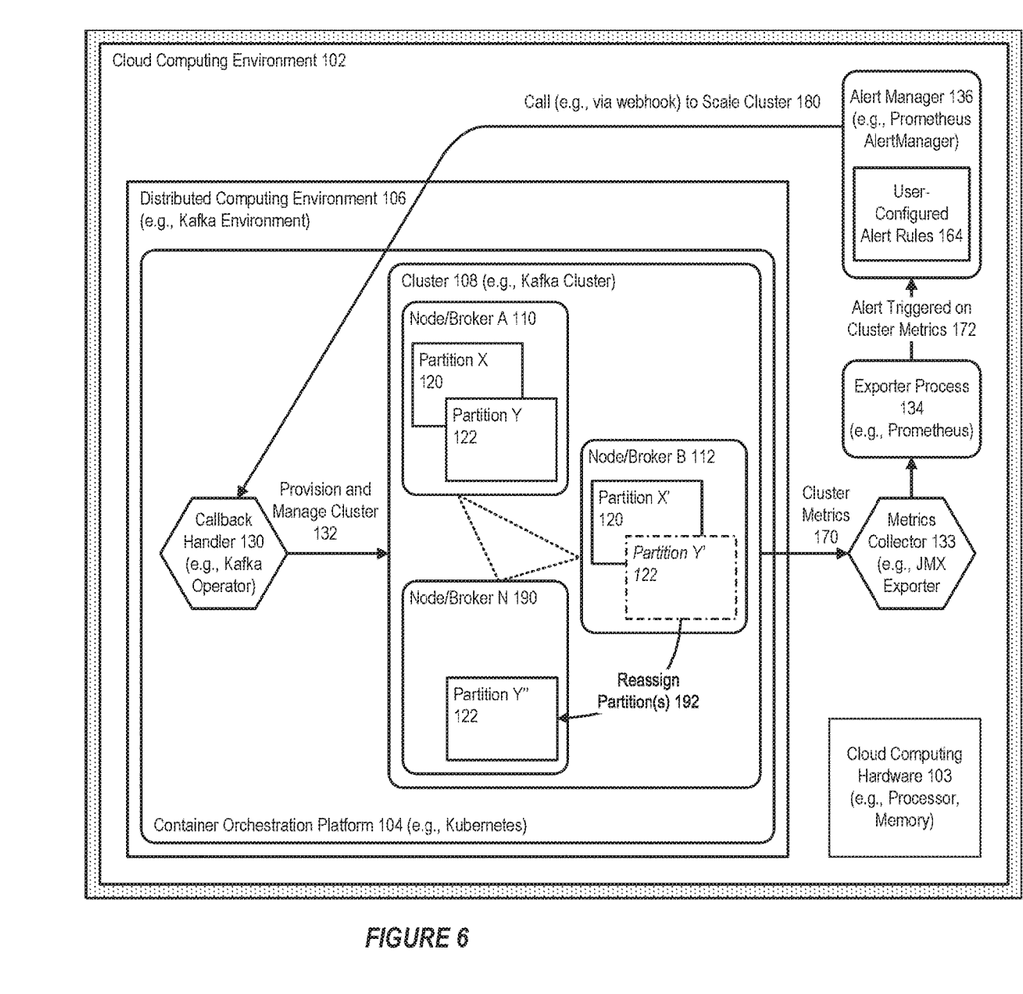
FIG. 6 further illustrates a system for automatically scaling a cluster based on metrics being monitored, in accordance with an embodiment.

FIG. 6 further illustrates a system for automatically scaling a cluster based on metrics being monitored, in accordance with an embodiment.

As illustrated in FIG. 6, in accordance with an embodiment, once the node/brokers are added to the cluster, the system can reassign 192 a selection of existing colocated partitions to the new nodes/brokers, such that computational load is more evenly distributed within the newly-scaled cluster environment.

Figure 7:
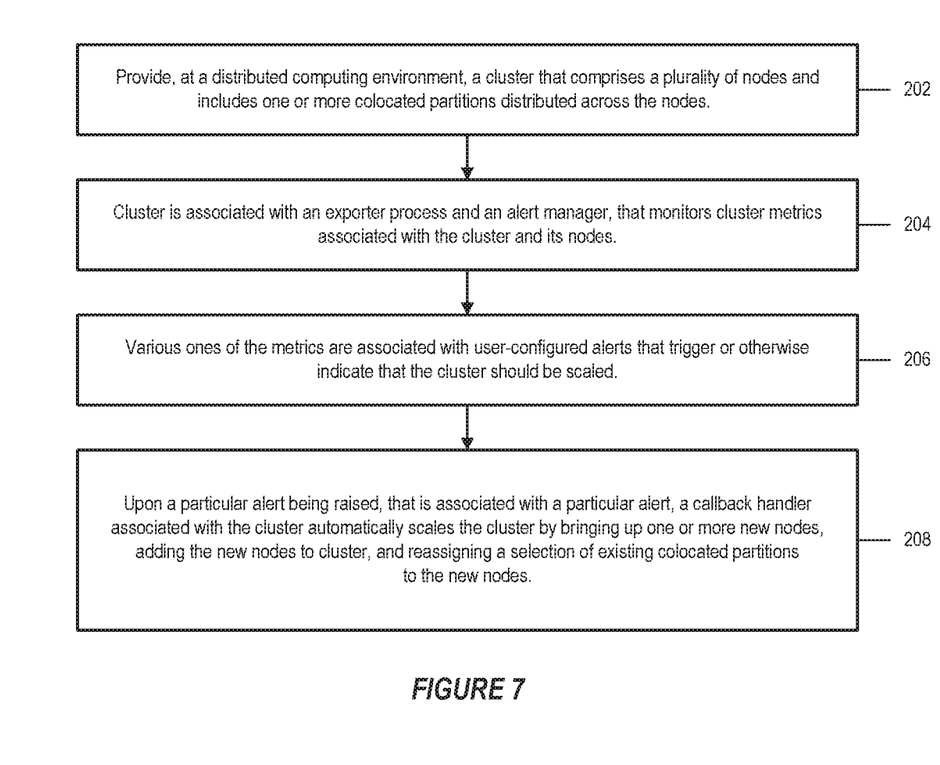
FIG. 7 illustrates a flowchart of a method for automatically scaling a cluster based on metrics being monitored, in accordance with an embodiment.

FIG. 7 illustrates a flowchart of a method for automatically scaling a cluster based on metrics being monitored, in accordance with an embodiment.

As illustrated in FIG. 7, in accordance with an embodiment, at step 202, the method includes providing, at a distributed computing environment, a cluster that comprises a plurality of nodes and includes one or more colocated partitions distributed across the nodes.

At step 204, the cluster is associated with an exporter process and an alert manager that monitors cluster metrics associated with the cluster and its nodes.

At step 206, various ones of the metrics are associated with user-configured alerts that trigger or otherwise indicate that the cluster should be scaled.

At step 208, upon a particular alert being raised, that is associated with a particular alert, a callback handler associated with the cluster automatically scales the cluster by bringing up one or more new nodes, adding the new nodes to cluster, and reassigning a selection of existing colocated partitions to the new nodes.

The above described embodiments of systems and methods are provided by way of example, and for purposes of illustration. In accordance with various embodiments, other types of callback handlers, operators, metrics collectors, exporter processes, and/or alert managers, can be used, with other types of distributed computing environments.

Example Implementation

As described above, in accordance with an embodiment, a JMX exporter can expose Kafka cluster metrics to an exporter process, for example as can be provided by a metrics monitoring and alerting environment, such as, for example a Prometheus server, or other type of exporter process or metrics monitoring and alerting environment, which communicates triggered alerts to an alert manager component, for example as can be provided by a Prometheus AlertManager, or other type of alert manager.

For example, in accordance with an embodiment, a Prometheus server can evaluate the user-configured alert rules against the Kafka cluster metrics, and generate an alert to a Prometheus AlertManager component.

As also described above, in accordance with an embodiment, an alert can be associated with, for example, a webhook or other type of callback which, when called 180, operates with the Kafka operator to initiate scaling of the cluster, including the reassignment of a selection of existing colocated partitions to the new nodes/brokers.

For example, in accordance with an embodiment, the Prometheus AlertManager component can process a generated alert to trigger the configured webhook notification. The webhook callback on invocation, can process the alert and related labels or annotations passed to it, to scale the Kafka cluster to, for example, add a new broker.

In accordance with an embodiment, once a broker is added, the webhook can further run a partition reassignment plan on the Kafka cluster, to distribute the co-located partitions in a stressed broker, to the newly-added broker. Once partitions are reassigned and distributed across the cluster, the scaling operation is considered complete.

In accordance with an embodiment, a Kafka operator can include an indication of the user-configured alert rules and/or threshold values that, when breached or otherwise exceeded, respectively, will trigger a scaling alert. For example, a scale up alert can further trigger a scale up of the Kafka cluster and a redistribution of the Kafka partitions across new servers added in the scale up of the Kafka cluster.

In accordance with an embodiment, the Kafka operator can continuously monitor metrics from the Kafka cluster via a monitoring tool, for example a Prometheus monitoring tool instance that is configured to monitor the Kafka cluster using JMX and MBeans.

For example, in accordance with an embodiment, a Prometheus server and Prometheus AlertManager can be used to monitor metrics of the Kafka cluster emitted by a JMX exporter, which can be deployed running as a side-car container alongside Kafka on, e.g., the Kubernetes platform, and which collects the Kafka cluster metrics from the Kafka brokers. The Kafka cluster metrics are then pulled by the Prometheus instance executing on the server.

In accordance with an embodiment, the Prometheus instance can evaluate a set of user-configured alert rules and/or threshold values against the received cluster metrics.

For example, in accordance with an embodiment, when an alert rule evaluates as "true", the Prometheus server can trigger an alert to the Prometheus AlertManager, which can then call a webhook uniform resource locator (URL) configured in the Kafka operator. Through the webhook URL, details of the alert triggered, and other information (e.g., namespace, Kafka release name, Zookeeper connect URL, or topic names) is passed, that helps the operator to perform a scaling operation on the cluster.

Figure 8:
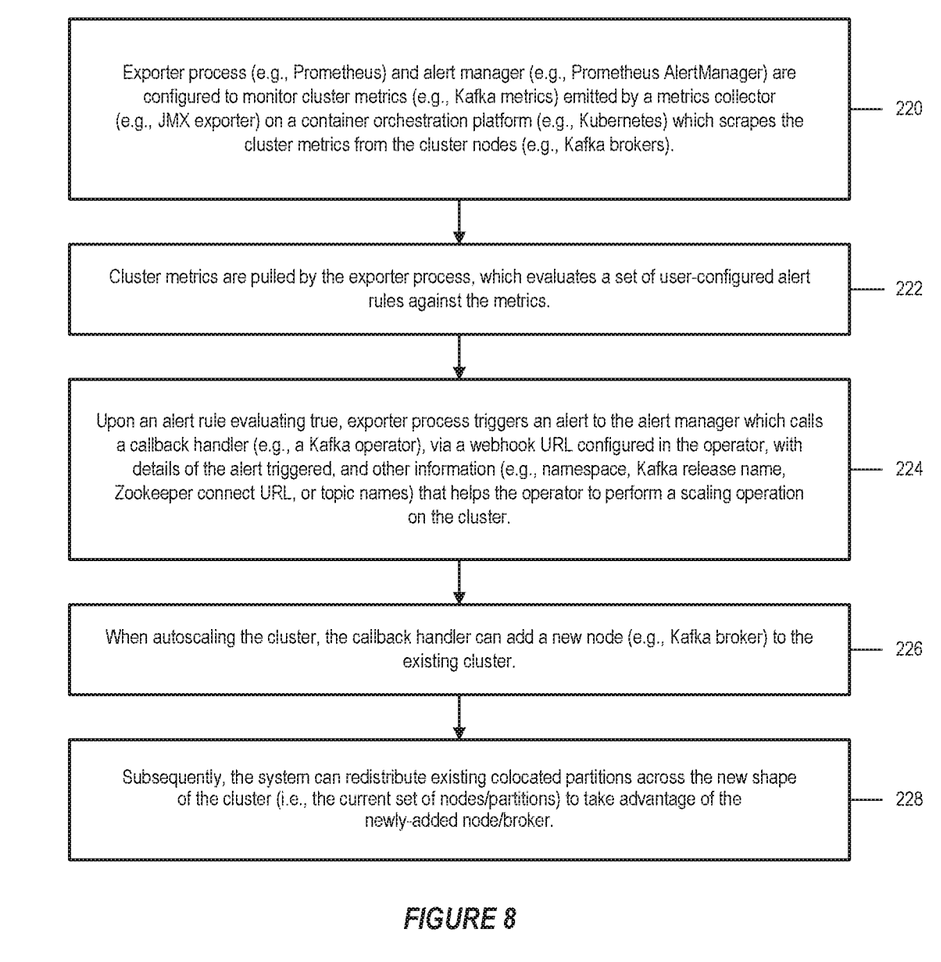
FIG. 8 illustrates a flowchart of another method for automatically scaling a cluster based on metrics being monitored, in accordance with an embodiment.

FIG. 8 illustrates a flowchart of another method for automatically scaling a cluster based on metrics being monitored, in accordance with an embodiment.

As illustrated in FIG. 8, in accordance with an embodiment, at step 220, an exporter process (e.g., Prometheus) and alert manager (e.g., Prometheus AlertManager) are configured to monitor cluster metrics (e.g., Kafka cluster metrics) emitted by a metrics collector (e.g., JMX exporter) on a container orchestration platform (e.g., Kubernetes) which scrapes the cluster metrics from the cluster nodes (e.g., Kafka brokers).

At step 222, cluster metrics are pulled by the exporter process, which evaluates a set of user-configured alert rules against the metrics.

At step 224, upon an alert rule evaluating true, exporter process triggers an alert to the alert manager which calls a callback handler (e.g., a Kafka operator), via a webhook URL configured in the operator, with details of the alert triggered, and other information (e.g., namespace, Kafka release name, Zookeeper connect URL, or topic names) that helps the operator to perform a scaling operation on the cluster.

At step 226, when autoscaling the cluster, the callback handler can add a new node (e.g., Kafka broker) to the existing cluster.

At step 228, subsequently, the system can redistribute existing colocated partitions across the new shape of the cluster (i.e., the current set of nodes/partitions) to take advantage of the newly-added node/broker.

Alert Rules Configuration

In accordance with an embodiment, it is the responsibility of the user, e.g., system administrator, to define appropriate user-configured alert rules and/or threshold values that will be used to scale the cluster.

In accordance with an embodiment, for purposes of illustration, an example alert rule is illustrated below which triggers an alert to scale up when the total number of partitions on the broker "my-kafka-kafka-O" is more than one.

```
ALERT KafkaScaleUp
IF (sum kafka_server_replicamanager_partitioncount
{namespace="<REPLACE_NS>",
pod="mykafkakafka0",
service="mykafkakafka"})
by(namespace, service)) > 1
    FOR 1s
    LABELS {severity ="high", scaleoperation ="up"}
    ANNOTATIONS
    {
        summary ="Kafka Broker {{ $labels.pod }}
            has more partitions than it can handle.",
        description ="Kafka Broker {{ $labels.pod }}
            has more partitions than it can handle.
            Scale up the Kafka cluster.",
    }
```

Webhook Configuration

In accordance with an embodiment, the alert manager (e.g., Prometheus AlertManager) must be configured with an appropriate route and receiver to call the webhook or other type of callback, to scale the cluster, when the user specified alert is triggered.

For example, in accordance with an embodiment, if the webhook URL for the Kafka operator is "http://127.0.0.1:8080/" then the appropriate route and receiver can be configured as illustrated below:

```
receivers:
    name: 'kafkascaleupwebhook'
    webhook_configs:
        url: 'http://127.0.0.1:8080/'
```

In accordance with an embodiment, a route with an appropriate match expression can be provided to determine which receiver should be called when an alert is triggered.

Partition Reassignment Plan

In accordance with an embodiment, when the Kafka cluster is scaled up, the required topics/partitions must be reassigned explicitly to take advantage of the newly-added brokers. Although Kafka supports a partition reassignment tool that provides a mechanism to automatically generate a new reassignment plan for a given cluster shape (i.e., set of nodes/partitions), the default plan generated by such a partition reassignment tool may not suffice in all scenarios.

To address this, in accordance with an embodiment, the Kafka operator can operate in an intelligent manner, for example to provide that heavily loaded partitions do not coexist within a same Kafka broker after those partitions have been redistributed across the new shape of the cluster.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although many of the features and techniques described herein are illustrated using the example of a Kafka environment; and a Prometheus server; in accordance with various embodiments, the features and techniques can be similarly used with other types of distributed computing environments and/or other types of exporter process or metrics monitoring and alerting environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use in a distributed computing environment, for automatically scaling a cluster based on metrics being monitored, comprising:
    a computer including a processor, and a distributed computing environment having a cluster that comprises a plurality of nodes and includes one or more colocated partitions distributed across the nodes, said distribution being based upon an original partition assignment plan, the original partition assignment plan specifying the distribution of the one or more colocated partitions to specific ones of the plurality of nodes;
    wherein the cluster is associated with an exporter process and an alert manager, that monitors cluster metrics associated with the cluster and its nodes;
    wherein various ones of the metrics are associated with user-configured alerts that trigger or otherwise indicate that the cluster should be scaled;
    whereupon a particular alert being raised, that is associated with a particular alert, a callback handler associated with the cluster automatically scales the cluster by bringing up one or more new nodes, adding the new nodes to cluster; and
    wherein upon the callback handler adding the new nodes to the cluster, the callback handler reassigns a selection of existing colocated partitions to the new nodes added to the cluster,
    wherein said reassignment of the selection of existing colocated partitions is based upon a determined partition reassignment plan, said partition reassignment plan being determined by the callback handler, said determination of the partition reassignment plan being based upon the original partition assignment plan and cluster metrics and annotations passed to the callback handler by the alert manager, the partition reassignment plan being further based on a new shape of the cluster.

2. The system of claim 1, wherein the reassigning of the selection of existing colocated partitions to the new nodes enables a load performed by the cluster within the distributed computing environment to be more evenly distributed across the nodes of the cluster.

3. The system of claim 2, wherein the distributed computing environment is a Kafka environment, including that the cluster is a Kafka cluster, the nodes are Kafka brokers, the partitions are Kafka partitions, and the callback handler is a Kafka operator.

4. The system of claim 3, wherein the Kafka cluster is automatically scaled up or down, depending on a current workload and in accordance with user-configured alerts.

5. The system of claim 3, wherein the cluster metrics are received by a metrics collector.

6. The system of claim 5, wherein the metrics collector is a JMX exporter that communicates the cluster metrics to the exporter process and the alert manager.

7. A method for use in a distributed computing environment, for automatically scaling a cluster based on metrics being monitored, comprising:
    providing, at a distributed computing environment, a cluster that comprises a plurality of nodes and includes one or more colocated partitions distributed across the nodes, said distribution being based upon an original partition assignment plan, the original partition assignment plan specifying the distribution of the one or more collocated partitions to specific ones of the plurality of nodes;
    wherein the cluster is associated with an exporter process and an alert manager, that monitors cluster metrics associated with the cluster and its nodes;
    wherein various ones of the metrics are associated with user-configured alerts that trigger or otherwise indicate that the cluster should be scaled;
    whereupon a particular alert being raised, that is associated with a particular alert, a callback handler associated with the cluster automatically scales the cluster by bringing up one or more new nodes, adding the new nodes to cluster; and
    wherein upon the callback handler adding the new nodes to the cluster, the callback handler reassigns a selection of existing colocated partitions to the new nodes added to the cluster, wherein said reassignment of the selection of existing colocated partitions is based upon a determined partition reassignment plan, said partition reassignment plan being determined by the callback handler, said determination of the partition reassignment plan being based upon the original partition assignment plan and cluster metrics and annotations passed to the callback handler by the alert manager, the partition reassignment plan being further based on a new shape of the cluster.

8. The method of claim 7, wherein the reassigning of the selection of existing colocated partitions to the new nodes enables a load performed by the cluster within the distributed computing environment to be more evenly distributed across the nodes of the cluster.

9. The method of claim 7, wherein the distributed computing environment is a Kafka environment, including that the cluster is a Kafka cluster, the nodes are Kafka brokers, the partitions are Kafka partitions, and the callback handler is a Kafka operator.

10. The method of claim 9, wherein the Kafka cluster is automatically scaled up or down, depending on a current workload and in accordance with user-configured alerts.

11. The method of claim 9, wherein the cluster metrics are received by a metrics collector.

12. The method of claim 11, wherein the metrics collector is a JMX exporter that communicates the cluster metrics to the exporter process and the alert manager.

13. A non-transitory computer readable storage medium, including instructions stored thereon which when read and executed by one or more computers cause the one or more computers to perform a method comprising:
- providing, at a distributed computing environment, a cluster that comprises a plurality of nodes and includes one or more colocated partitions distributed across the nodes, said distribution being based upon an original partition assignment plan, the original partition assignment plan specifying the distribution of the one or more collocated partitions to specific ones of the plurality of nodes;
- wherein the cluster is associated with an exporter process and an alert manager, that monitors cluster metrics associated with the cluster and its nodes;
- wherein various ones of the metrics are associated with user-configured alerts that trigger or otherwise indicate that the cluster should be scaled;
- whereupon a particular alert being raised, that is associated with a particular alert, a callback handler associated with the cluster automatically scales the cluster by bringing up one or more new nodes, adding the new nodes to cluster; and
- wherein upon the callback handler adding the new nodes to the cluster, the callback handler reassigns a selection of existing colocated partitions to the new nodes added to the cluster, wherein said reassignment of the selection of existing colocated partitions is based upon a determined partition reassignment plan, said partition reassignment plan being determined by the callback handler, said determination of the partition reassignment plan being based upon the original partition assignment plan and cluster metrics and annotations passed to the callback handler by the alert manager, the partition reassignment plan being further based on a new shape of the cluster.

14. The non-transitory computer readable storage medium of claim 13, wherein the reassigning of the selection of existing colocated partitions to the new nodes enables a load performed by the cluster within the distributed computing environment to be more evenly distributed across the nodes of the cluster.

15. The non-transitory computer readable storage medium of claim 13, wherein the distributed computing environment is a Kafka environment, including that the cluster is a Kafka cluster, the nodes are Kafka brokers, the partitions are Kafka partitions, and the callback handler is a Kafka operator.

16. The non-transitory computer readable storage medium of claim 15, wherein the Kafka cluster is automatically scaled up or down, depending on a current workload and in accordance with user-configured alerts.

17. The non-transitory computer readable storage medium of claim 15, wherein the cluster metrics are received by a metrics collector.

18. The non-transitory computer readable storage medium of claim 17, wherein the metrics collector is a JMX exporter that communicates the cluster metrics to the exporter process and the alert manager.

* * * * *

UNITED STATES PATENT AND TRADEMARK OFFICE
CERTIFICATE OF CORRECTION

PATENT NO. : 11,526,386 B2
APPLICATION NO. : 16/374586
DATED : December 13, 2022
INVENTOR(S) : Srivastava et al.

It is certified that error appears in the above-identified patent and that said Letters Patent is hereby corrected as shown below:

In the Drawings

On sheet 1 of 8, in FIGURE 1, under Reference Numeral 133, Line 4, delete "Exporter" and insert -- Exporter) --, therefor.

On sheet 2 of 8, in FIGURE 2, under Reference Numeral 133, Line 4, delete "Exporter" and insert -- Exporter) --, therefor.

On sheet 3 of 8, in FIGURE 3, under Reference Numeral 133, Line 4, delete "Exporter" and insert -- Exporter) --, therefor.

On sheet 4 of 8, in FIGURE 4, under Reference Numeral 133, Line 4, delete "Exporter" and insert -- Exporter) --, therefor.

On sheet 5 of 8, in FIGURE 5, under Reference Numeral 133, Line 4, delete "Exporter" and insert -- Exporter) --, therefor.

On sheet 6 of 8, in FIGURE 6, under Reference Numeral 133, Line 4, delete "Exporter" and insert -- Exporter) --, therefor.

Signed and Sealed this
Fifteenth Day of August, 2023

Katherine Kelly Vidal
*Director of the United States Patent and Trademark Office*